United States Patent Office 2,889,315
Patented June 2, 1959

2,889,315

WATER SOLUBLE DYE SALTS AND PROCESS FOR THE PRODUCTION THEREOF

Werner Bossard, Riehen, near Basel, Jacques Voltz and François Favre, Basel, Switzerland, assignors to J. R. Geigy A.-G., Basel, Switzerland, a Swiss firm No Drawing. Application December 12, 1955
Serial No. 552,294

Claims priority, application Switzerland
December 15, 1954

6 Claims. (Cl. 260—146)

The invention concerns water soluble dye salts containing an azo dyestuff as cation and processes for the production thereof from azo dyestuffs which contain a benzthiazole ring and which are insoluble in water.

It has been found that stable, water soluble dye salts which contain the azo dyestuff as cation are obtained if an azo dyestuff having no acid dissociating, salt forming groups, of the general Formula I

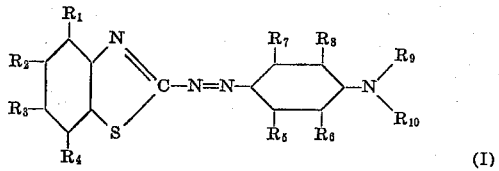

is reacted at a raised temperature with suitable alkylating agents. In this formula $R_1$ to $R_8$ represent the non-ionogenic substituents, including hydrogen, attached to the carbon rings, one of which at least must not represent hydrogen. The group

represents an amino group and $R_9$ and $R_{10}$ thus represent hydrogen or aliphatic, araliphatic, aromatic and alicyclic substituents. Of $R_1$ to $R_{10}$, two neighbouring substituents can also form a ring, for example an isocyclic or a heterocyclic ring.

In the dyestuffs according to the present invention, $R_3$ represents preferably a substituent with a positive action, e. g. an alkyl or an ether group. It can also represent methyl, ethyl, isopropyl, tert. butyl, tert. amyl, methoxy, ethoxy, phenoxy, benzyloxy groups in addition to methyl mercapto or phenyl mercapto groups as well as groups forming a ring with a neighbouring substituent such as the dihydroxymethylene group, tetramethylene group or the dioxine ring. Valuable greenish-blue dyestuffs are also obtained if a neighbouring pair of $R_1$ to $R_4$ represent a fused benzene ring. In other respects however, the benzene ring of the benzthiazole radical can be substituted within the bounds of the definition as desired, e. g., by halogen, nitro, acylamino, alkyl sulphonyl, carboxylic acid ester, sulphonic acid amide, phenyl or benzyl groups. The p-phenylene radical bound to the azo group can form part of a fused ring system. Either the pair of substituents $R_5$ and $R_6$ or the pair $R_7$ and $R_8$ can be bound to form rings in such a manner that they can represent either a fused benzene ring or a hydrogenated isocyclic or heterocyclic ring. For example with the p-phenylene radical they can form a naphthalene radical, a tetrahydronaphthalene radical, a benzimidazole, benztriazole or indazole radical. Advantageously however, $R_5$ to $R_8$ represent two hydrogen atoms in the p-position to each other, as p-aminobenzene azo dyestuffs are particularly valuable. In a preferred group from this class of dyestuffs according to the present invention, $R_5$ is a substituent usual in azo dyestuffs, e. g. an alkyl, alkoxy, acylamino group or a halogen atom. However, it can represent a more negative group such as e.g. an alkyl sulphonyl and the nitro group. If $R_5$ is an alkyl or an alkoxy group, the amino group in the p-position can be primary, otherwise it is substituted, preferably organically, i.e. it is either a secondary or advantageously a tertiary amino group. Organic substitutents of the amino group can be aliphatic, araliphatic, cycloaliphatic or aromatic, the heterocyclic-aliphatic groups like the furyl methyl group also being understood by the term araliphatic. The organic substituents can be further substituted, such as for example in the oxalkyl, fluoralkyl, cyanalkyl, alkoxyalkyl, phenoxyalkyl, the alkylbenzyl, halogen benzyl, alkoxybenzyl, alkylphenyl or alkoxyphenyl groups. Aliphatic substituents of the amino group can also form hetero rings among themselves, possibly including ether atoms or linked to the substituents $R_6$ and $R_8$ such as in the piperidino, morpholino, the 1.2.3.4-tetrahydroquinoline, the lilolidine, the julolidine or the perimidine compounds. One of the two nitrogen substituents is advantageously a cyanethyl, benzyl, or phenyl radical. Thus, whilst the azo dyestuffs usable according to the present invention can be further substituted with non-ionogenic substituents as desired, acid dissociating, salt forming groups such as for example the carboxyl and the sulphonic acid group are excluded as substituents.

Alkylating agents suitable for the production of the dye salts according to the present invention are the esters of strong mineral acids and organic sulphonic acids of preferably lower alcohols. Alkyl chlorides, alkyl bromides, alkyl iodides, aralkyl halides such as benzyl bromide, benzyl halides substituted at the benzene ring by halogen, alkyl or alkoxy groups, dialkyl sulphates and alkyl-p-methyl benzene sulphates are chiefly used. The azo dyestuffs usable according to the present invention are reacted with the suitable alkylating agents advantageously in inert organic solution, the water soluble dye salts separating out. Examples of solvents are benzene hydrocarbons, halogenobenzenes and nitro benzenes, high boiling aliphatic and alicyclic hydrocarbons as well as stable halogen alkanes such as carbon tetrachloride, tetrachlorethylene. Also an excess of alkylating agent can be used as solvent. The reaction is exothermic. To start the reaction, however, warming is necessary in particular when there is a large amount of diluent. In some favourable cases however, salt formation also occurs in aqueous or alcoholic solution or suspension, the dye salts formed being dissolved and isolated by salting out. If the reaction is performed in organic solvents, these can be removed by filtration or, due to the stability of the dye salts according to the present application, they can be removed either by distilling off, possibly under reduced pressure or by steam distillation. The dye salts according to the present invention can be obtained from organic solution also by extraction with water. It is of advantage to use an excess of alkylating agent, whereby any primary and secondary amino groups can also be subsequently alkylated. However, the formation of the cyclammonium salt is clearly preferred so that under the usual working conditions dyestuffs do not result which are similar to those with a tertiary p-amino group, from analogous dyestuffs with a primary or secondary p-amino group. If necessary, the dye salts according to the present invention can also be modified subsequently, for example, they can be acylated.

Some of the dyestuffs usable according to the present invention are known, others can be produced by methods known per se by diazotising 2-aminobenzthiazole compounds and coupling with aminoaryl compounds coupling in the p-position to a primary, secondary or tertiary amino group, or by alkaline condensation of p-nitroso-aminoaryl compounds with 2-aminobenzthiazole compounds.

The die salts according to the present invention having no acid dissociating, salt forming groups in the cation, correspond to the general Formula II:

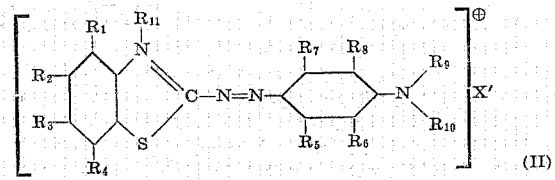

In this formula: $R_{11}$ represents an alkyl radical which can be further substituted, e.g. a methyl, ethyl, propyl, butyl, oxethyl, benzyl, p-methylbenxyl radical, $R_1$ to $R_8$ represent the non-ionogenic substituents, including hydrogen, attached to the carbon rings, of which at least one must not be hydrogen, e.g. alkyl, alkylene, phenyl, benzyl, halogen, ether, nitro, acylamino, alkyl sulphonyl, sulphonic acid amide, carboxylic acid ester or carboxylic acid amide substituents, $R_9$ and $R_{10}$ represent hydrogen or organic substituents, e.g. alkyl, alkylene, aralkyl, cycloalkyl, phenyl substituents, whereby of $R_1$ to $R_{11}$ two neighbouring substituents can together form a ring which can be isocyclic, e.g. a fused benzene ring, a tetramethylene group, or it can be heterocyclic e. g. a methylene-dioxy ring, a dioxine ring, a triazole, imidazole, pyrazole ring, or with $R_9$ and $R_{10}$ it can also be a piperidino, morpholine or tetrahydro-pyridine ring. $X'$ represents the uncoloured anion equivalent to the coloured cation, e.g. chlorine ion, bromine ion, iodine ion, methosulphate ion, ethosulphate ion, bisulphate ion, sulphate ion, benzene sulphonate ion, p-toluene sulphonate ion; it can however, also represent ions of stronger organic acids, e.g. ions of acetic acid, formic acid oxalic acid, lactic acid, tartaric acid, chloracetic aid, sulpho-acetic acid and possibly even the hydroxyl ion. The production and use of the double salts with inorganic salts is often advantageous, in particular the zinc chloride double salts. Thus complex anions can be used as anions equivalent to the caiton, e.g. the halogenozincate cation. As can be seen, the uncoloured anion $X'$ is of secondary importance; the dyestuff character is determined by the cation. But it is favourable for the water solubility if $X'$ represents one of the anions of strong acids first listed above.

According to their character, the dye salts according to the present invention can be described as basic dyestuffs. Particularly in the form of salts of strong inorganic and organic acids they dissolve well in water. Less easily soluble compounds can be dissolved in diluted aqueous mineral acids. In aqueous solution, the dye salts according to the present invention dye cotton mordanted with tartar emetic and tannin, silk, leather and synthetic polymeric fibres containing nitrogen which are produced from polyacrylonitrile or chiefly from acrylonitrile, generally in very pure shades. The dyeings attained with the dyestuffs according to the present invention are often distinguished by their fastness to light.

The following examples serve to illustrate the invention. Where not otherwise stated, the parts are given as parts by weight and the temperatures are in degrees centigrade. The relationship of parts by weight to parts by volume is as that of kilogrammes to litres.

*Example 1*

A diazo solution is prepared from 18 parts of 2-amino-6-methoxy benzthiazole, 300 parts of 60% acetic acid, 20 parts of concentrated sulphuric acid and 34 parts of nitrosyl sulphuric acid, corresponding to 6.9 parts of sodium nitrite. A solution of 15.3 parts of 1-amino-2.5-dimethoxybenzene in 100 parts of glacial acetic acid is added dropwise at $-15°$ to $-5°$ to the diazo solution. After stirring for 2 hours, 300 parts of water are added to the coupling mass and the mineral acid reaction is buffered with lye until Congo red paper is no longer coloured blue. The precipitated brown-violet dyestuff is drawn off under suction, washed with a lot of water and dried in the vacuum at 70°.

3.5 parts of the well dried dyestuff are heated for 5 hours under pressure at 120–140° with 4.4 parts of ethyl bromide in 200 parts of abs. alcohol in the presence of 0.8 part of magnesium oxide. The greater part of the solvent is then distilled off in the vacuum. To further purify, the residue is taken up in 250 parts of warm water and the solution is clarified with a little animal charcoal. The dyesalt is precipitated from the filtered solution with 1.5 parts of zinc chloride and 25 parts of sodium chloride. After drawing off under suction and drying, the dyestuff dissolves in water with a blue and in concentrated sulphuric acid with a yellow colour. It dyes silk, leather, mordanted cotton and polyacrylonitrile fibers from an acetic acid solution in violet shades which have good fastness properties.

Products with similar properties are obtained if, keeping to the above conditions, the alkylation is performed with the corresponding amounts of benzyl bromide, methyl iodide, ethyl iodide or n-butyl iodide.

Dyestuffs with similar properties are obtained if the above diazo component is coupled to form the monoazo dyestuff with the coupling components given in the following table and the amounts of substances given are used and otherwise the same procedure is followed. The same products are also obtained if the alkylation is performed in boiling tetrachlorethane with dimethyl sulphate, diethyl sulphate etc.

| No. | Coupling component | Parts dyestuff | Parts solvent | Alkylating agent | Dyeing on polyacrylonitrile fibres |
|---|---|---|---|---|---|
| 1 | Aminobenzene [1] | 2.9 | 200 | 4.4 parts ethyl bromide | Violet. |
| 2 | 1-amino-3-methyl benzene | 3.0 | 200 | do | Do. |
| 3 | 1-amino-3-chloro-benzene | 3.2 | 200 | 1.6 parts methyl iodide | Do. |
| 4 | 1-amino-3-methoxybenzene | 3.2 | 250 | 4.4 parts ethyl bromide | Do. |
| 5 | 1-amino-3-acetaminobenzene | 3.4 | 250 | do | Do. |
| 6 | 1-amino-2.5-dimethylbenzene | 3.1 | 200 | 2.0 parts n-butyl iodide | Do. |
| 7 | 1-amino-2-methoyx-5-methylbenzene | 3.3 | 200 | do | Do. |
| 8 | 1-amino-2-methoxy-5-acetaminobenzene | 3.7 | 250 | 4.4 parts ethyl bromide | Do. |
| 9 | N-ethyl-N-benzylaminobenzene | 3.9 | 250 | do | Blue. |

[1] The dyestuff is obtained by coupling with the sodium salt of methylaminobenzene-ω-sulphonic acid and then saponifying to form the p-amino-monazo dyestuff.

The dye salts obtained with the coupling components numbers 1 to 8 inclusive in the above table all dissolve in water with a violet and in concentrated sulphuric acid with a yellow colour. That obtained with coupling component No. 9 dissolves in water with a blue colour and in concentrated sulphuric acid with a yellow colour.

*Example 2*

A solution of 20 parts of 2-amino-(naphtho-1'.2':4.5)-thiazole in 20 parts of acetic acid is added to a mixture which has been cooled to $-10°$ of 220 parts of sulphuric acid 60° Bé. and 150 parts of water. It is diazotised within 2 hours at −10° with 13.4 parts of nitrosyl sulphuric acid, corresponding to 6.9 parts of sodium nitrite and, after stirring the reaction mass for half an hour, it is poured into 1500 parts of ice water. A weakly aqueous/mineral acid solution of 13.3 parts of N-ethyl-N-benzyl-amino-benzene is added to the clarified diazo solution at 0–5°, the reaction is buffered until it is neutral to Congo red paper and the brown-violet dyestuff which precipitates is drawn off under suction, washed and dried.

10 parts of p-toluene sulphonic acid methyl ester in 20 parts of xylene are added dropwise at 110° within 5 minutes to a solution of 4.2 parts of this dyestuff in 200 parts of xylene. The reaction solution is kept for 45 minutes at 110–120°. After cooling to 0°, the pure dyestuff obtained is drawn off under suction. It dissolves in concentrated sulphuric acid with a brown-red and in water with a blue colour. It dyes polyacrylonitrile fibres, silk, mordanted cotton and leather from an acetic acid bath in vivid blue shades which have good fastness properties.

Similar dyestuffs with the same good properties are obtained if instead of N-ethyl-N-benzyl-aminobenzene, N.N-dimethylaminobenzene, N.N-diethylaminobenzene, 1-N.N-diethylamino-3-methylbenzene, N.N - dibenzylaminobenzene, 3-N.N-diethylaminobenzene-1-sulphonic acid amide are used or if 2-amino-(naphtho-1′.2′:5.4)-thiazole is used as diazo component.

mixture for some time, 300 parts of water are added and the mineral acid reaction is buffered with sodium acetate. The brown-violet dyestuff which precipitates is drawn off under suction, washed and dried in the vacuum at 70°.

1.9 parts of dimethyl sulphate in 10 parts of chlorobenzene are added dropwise at boiling temperature within 1 hour to a solution of 4.1 parts of this dyestuff in 100 parts of chlorobenzene. A change in colour from red-violet to blue of the solution and precipitation of the dyestuff can be observed. After cooling the reaction mass, the precipitated dyestuff is filtered off and, to further purify, is dissolved in 250 parts of hot water and precipitated with sodium chloride from the solution which has been clarified with a little animal charcoal. The dyestuff is drawn off under suction and dried. It dissolves in concentrated sulphuric acid with a yellow and in water with a blue colour. It dyes polyacryonitrile fibres, silk, leather and mordanted cotton from an acetic acid bath in vivid blue-violet shades which have good fastness properties.

If in the above example, instead of 1-N-ethyl-N-benzyl-amino-3-methoxybenzene the equivalent amounts of the coupling components given in the following table are used and the amounts given of alkylating agent are used, then dyestuffs with similar properties are obtained.

| No. | Coupling component | Parts dye-stuff | Parts solvent | Alkylating agent | Dyeing on polyacrylo-nitrile fibres |
|---|---|---|---|---|---|
| 1 | 1-N.N-diethylamino-3-methylbenzene | 3.4 | 120 | 2.1 parts p-toluene sulphonic acid methyl ester. | Red-Blue. |
| 2 | 1 - N.N-diethylamino-3-acetaminobenzene. | 3.9 | 120 | do | Do. |
| 3 | 1 - N.N-diethylamino-3-carbethoxybenzene. | 4.0 | 150 | do | Do. |
| 4 | 1 - N.N - di-β - cyanethylamino-3-chlorobenzene. | 4.1 | 150 | 1.9 parts diemethyl sulphate. | Do. |
| 5 | N.N-di-β-oxethylamino-benzene | 3.6 | 120 | do | Do. |
| 6 | N.N-dibenzylamino-benzene | 4.5 | 200 | do | Do. |
| 7 | N-methyl-N-β-oxethyl-aminobenzene | 3.3 | 180 | 2.1 parts diethyl sulphate | Do. |
| 8 | N - methyl-N-β-cyanethylaminobenzene | 3.4 | 200 | do | Do. |
| 9 | N-ethyl-N-benzyl-aminobenzene | 3.9 | 200 | do | Do. |
| 10 | 1-N.N-dimethylamino-3-nitrobenzene | 3.4 | 200 | 1.9 parts dimethyl sulphate. | Do. |
| 11 | 3 - N.N-diethylamino-benzene sulphonic acid dimethylamide. | 4.3 | 300 | do | Do. |
| 12 | 1 - N.N-dipropylamino-3-bromobenzene | 4.3 | 250 | 2.1 parts diethyl sulphate | Do. |

The dye salts obtained with all the coupling components given in the above table all dissolve in water with a blue-violet and concentrated sulphuric acid with a yellow colour.

Example 3

A diazo solution is produced from 16.4 parts of 2-amino-6-methyl benzthiazole, 300 parts of 60% acetic acid, 20 parts of concentrated sulphuric acid and 20 parts of nitrosyl sulphuric acid, corresponding to 6.9 parts of sodium nitrite. A congo acid solution of 24.9 parts of 1-N-ethyl-N-benzylamino-3-methoxybenzene in the equivalent amount of 2-N-sulphuric acid is added at −15° to −5° to the diazo solution. After stirring the coupling

Example 4

The monoazo dyestuff from 2-amino-6-ethoxy benzthiazole and 1-N-ethylamino-3-methylbenzene is produced as described in Example 1.

3.4 parts of this dyestuff are dissolved in 100 parts of abs. toluene and 2.1 parts of diethyl sulphate in 10 parts of abs. toluene are added at 105°. The reaction mixture is boiled under reflux for one hour. After a few minutes the solution turns blue and the dye salt gradual-

| No. | Coupling component | Parts dye-stuff | Parts solvent | Alkylating agent | Dyeing on polyacrylo-nitrile fibres |
|---|---|---|---|---|---|
| 1 | 1-N-ethylamino-3-chlorobenzene | 3.5 | 200 | 2.1 parts p-toluene sulphonic acid methyl ester. | Violet. |
| 2 | 1-N-ethylamino-3-methoxybenzene | 3.4 | 200 | 1.9 parts dimethyl sulphate. | Do. |
| 3 | 1-N-ethylamino-3-ethoxybenzene | 3.6 | 200 | do | Do. |
| 4 | 1-N-methylamino-3-acetaminobenzene | 3.5 | 200 | 2.1 parts p-toluene sulphonic acid methyl ester. | Do. |
| 5 | 1-N-ethylamino-2.5-dimethoxybenzene | 3.7 | 200 | do | Do. |
| 6 | 1-N-ethylamino-2.5-dimethylbenzene | 3.4 | 200 | do | Do. |
| 7 | 1 - N-methylamino-2-methoxy-5-methyl-benzene. | 3.6 | 200 | 1.9 parts dimethyl sulphate. | Do. |
| 8 | 1 - N - methylamino-2-methoxy-5-acetaminobenzene. | 3.9 | 250 | 2.1 parts diethyl sulphate. | Do. |
| 9 | Diphenylamine | 5.0 | 250 | do | Blue. |
| 10 | 1-N-ethylamino-3-carbethoxybenzene | 3.9 | 150 | do | Violet. | ly precipitates in crystalline form. The blue-black dyestuff so obtained is filtered off after the reaction mass has been cooled. To further purify, the dyestuff is dissolved in 200 parts of warm water and is precipitated in the cold with 30 parts of sodium chloride. It dissolves in water with a violet and in concentrated sulphuric acid with a yellowish colour. The dyestuff dyes silk, mordanted cotton, and polyacrylonitrile fibres from an acetic acid bath in violet shades which have good fastness properties.

Dyestuffs with similar properties are obtained if dyestuffs are alkylated which have the corresponding amounts of the monoalkylated anilines given in the following table as coupling components instead of 1-N-ethyl-amino-3-methylbenzene and the amounts of substances given in the table are used and the conditions described are kept. The dye salts obtained with the coupling components Nos. 1 to 8 inclusive and with No. 10 all dissolve in water with a violet and in concentrated sulphuric acid with a yellow colour. That obtained with coupling component No. 9 dissolves in water with a blue and in concentrated sulphuric acid with a yellow colour.

*Example 5*

The monoazo dyestuff from 2-amino-6-chlorobenzthiazole and 1-N.N-dimethylaminonaphthalene is produced as described in Example 3. A solution of 3.6 parts of this dyestuff in 200 parts of abs. alcohol is heated under pressure for 2 hours at 120° with 4.4 parts of ethyl bromide. The reaction mixture is evaporated to dryness and the residue is worked up as described in Example 1. The dye salt is dried in the vacuum at 70°. The blue-black dyestuff dissolves in concentrated sulphuric acid with a yellow and in water with a blue colour. It dyes polyacrylonitrile fibres, mordanted cotton and silk from an acetic acid bath in vivid red-blue shades. Dyeings of the same shade are obtained with the zinc chloride double salts.

Similar shades are obtained with the alkylated dyestuffs which are produced from the same diazo compound and the following coupling components: 1-N-phenylaminonaphthalene, 1-N.N-dimethylamino-2-methoxynaphthalene or 1.2.3.4 tetrahydro-5.6-benzoquinoline.

*Example 6*

16.4 parts of 2-amino-4-methyl benzthiazole in 200 parts of sulphuric acid 60° Bé. and 150 parts of water are diazotised within 2 hours with 25 parts of nitrosyl sulphuric acid which correspond to 6.9 parts of sodium nitrite. The clear diazo solution is diluted with 1000 parts of ice water and a solution of 18.3 parts of N-methyl diphenylamine in 200 parts of 15% sulphuric acid is slowly added at 0–5°. The whole is stirred for 3 hours, then the mineral acid reaction is buffered with saturated sodium acetate solution until Congo red paper is no longer coloured blue. The red dyestuff which precipitates in crystalline form is filtered off, washed with a lot of water and dried in the vacuum.

The dry dyestuff is converted into the corresponding cyclammonium salt with dimethyl sulphate in boiling chlorobenzene as described in Example 1. The dark blue methylation product dissolves in water with a blue and in concentrated sulphuric acid with a yellow colour. It dyes polyacrylonitrile fibres, mordanted cotton, silk and leather from an acetic acid bath in vivid blue shades which have good fastness properties.

Similar fast dyeings are obtained if alkylated dyestuffs are used which have the following 2-amino benzthiazole derivatives as diazo components instead of 2-amino-4-methyl benzthiazole: 2-amino-6-ethyl benzthiazole, 2-amino-6-phenyl benzthiazole, 2-amino-6-chloro benzthiazole, 2-amino-6-carbethoxy benzthiazole, 2-amino-6-methoxy benzthiazole, 2-amino-6-ethoxy benzthiazole, 2-amino-6-methyl sulphonyl benzthiazole, 2-amino-4-chloro benzthiazole, 2-amino-4-ethyl benzthiazole, 2-amino-6-thiocyano benzthiazole, 2-amino-6-cyano benzthiazole, 2-amino-4-bromo benzthiazole, 2 - amino-(naphtho-1'.2': 4.5)-thiazole or 2-amino-(naphtho-1'.2':5.4)thiazole.

Similar blue dyestuffs are obtained if, in compounds produced with the above diazo components, corresponding amounts of triphenyl amine are used as coupling component and the alkylation is performed as given in the above example.

*Example 7*

A diazo solution is prepared from 15 parts of 2-amino-benzthiazole, 300 parts of 60% acetic acid, 20 parts of concentrated sulphuric acid and 20 parts of nitrosyl sulphuric acid, corresponding to 6.9 parts of sodium nitrite. A Congo acid solution of 2.2 parts of 1-N-ethyl-N-benzylamino-3-bromobenzene in the equivalent amount of 2-N-sulphuric acid is added dropwise at −15° to −5° to the diazo solution. After stirring the coupling mixture for 2 hours, the mineral acid reaction is buffered with concentrated caustic soda lye until Congo red paper is no longer coloured blue. The red dyestuff is drawn off under suction, washed with a lot of water and dried in the vacuum at 70°.

Products with similar dyeing properties are obtained starting from monoazo dyestuffs which are produced in an analogous manner with the coupling components given in the following table and otherwise by keeping to the above conditions and using the amounts given in the following table.

| No. | Coupling component | Parts dyestuff | Parts solvent | Alkylating agent | Solution colour in H₂O | Dyeing on polyacrylonitrile fibres |
|---|---|---|---|---|---|---|
| 1 | 1-amino-2.6-dimethyl benzene | 2.9 | 150 | 2.1 parts p-toluene sulphonic acid methyl ester. | Violet | Violet. |
| 2 | 1-amino-3-methoxybenzene | 2.9 | 150 | 1.9 parts dimethyl sulphate. | do | Do. |
| 3 | 1-N-ethylamino-3-methylbenzene | 3.0 | 150 | do | Blue-violet | Blue-violet. |
| 4 | 1-amino-2.5-dimethoxybenzene | 3.2 | 200 | 2.75 parts p-toluene sulphonic acid ethyl ester. | Violet | Violet. |
| 5 | 1 - N.N - dimethylamino - 2.5 - dimethyl - benzene. | 3.1 | 200 | do | do | Do. |
| 6 | 1 - N.N - di - n - propylamino - 2 - ethoxy - 5 - methylbenzene. | 4.0 | 150 | 2.75 parts p-toluene sulphonic acid ethyl ester. | Blue-violet | Blue-violet. |
| 7 | 1 - N.N' - di - n - butylamino - 2 - methoxy - 5-acetaminobenzene. | 4.6 | 150 | 2.1 parts diethyl sulphate | do | Do. |
| 8 | 1-N.N-diethylamino-3-acetaminobenzene | 3.7 | 175 | do | Red-blue | Reddish blue. |
| 9 | 1 - N - methyl - β - cyanethylamino - 3 - methylbenzene. | 3.4 | 175 | do | Blue-violet | Red-blue. |
| 10 | 1-N-ethylamino-2.5-dichlorobenzene | 3.6 | 150 | do | do | Do. |
| 11 | 1-N.N-dimethylamino-3-nitrobenzene | 3.0 | 150 | do | do | Do. |
| 12 | 1 - N.N - diethylamino - 2 - methyl - 5 - methyl sulphonyl benzene. | 4.0 | 200 | 1.9 parts dimethyl sulphate. | do | Do. |
| 13 | 1 - N.N - diethylaminobenzene - 3 - sulphonic acid amide. | 3.9 | 300 | 2.75 parts p-toluene sulphonic acid methyl ester. | do | Do. |

3.8 parts of this monoazo dyestuff are dissolved in 150 parts of absolute chlorobenzene and 1.9 parts of dimethyl sulphate in 50 parts of chlorobenzene are added at the boiling temperature of the solvent. The reaction solution is boiled for one hour during which time the colour changes to blue and the dye salt gradually precipitates. After cooling the reaction solution, the precipitated dyestuff is filtered off, taken up in 200 parts of warm water, the aqueous solution is clarified with a little charcoal and the dye salt is precipitated with the aid of 1.5 parts of zinc chloride and 20 parts of sodium chloride in the form of the zinc chloride double salt. The yellow-bronzy powder so obtained is dried in the vacuum at 60–70°. It dissolves in water with a blue and in concentrated sulphuric acid with a yellow colour. It dyes silk, mordanted cotton and polyacrylonitrile fibres in vivid red-blue shades which have excellent fastness properties.

All the products obtained with the coupling components given in the above table dissolve in concentrated sulphuric acid with a yellow colour.

What we claim is:

1. A dyestuff of the formula:

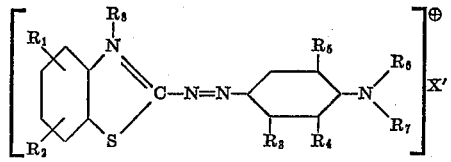

wherein the cation is free from acid salt-forming groups, $R_1$ to $R_5$ each represents a member selected from the class consisting of hydrogen, chlorine, bromine, lower alkyl, lower alkoxy, phenyl, carbo-lower alkoxy, sulphonic acid amide, lower alkylsulphonyl, nitro, acetylamino, cyano, and thiocyano groups and each of the pairs $R_1$ and $R_2$ and $R_3$ and $R_4$ together also may represent a fixed benzene ring, $R_6$ and $R_7$ each represents a member selected from the group consisting of hydrogen, lower alkyl, benzyl and phenyl radicals, and each of the pairs $R_4$, $R_7$ and $R_6$, $R_7$ together also may complete a hetero ring, $R_8$ represents a member selected from the class consisting of lower alkyl and benzyl radicals, and wherein of $R_1$ to $R_5$ at least one is other than hydrogen, and $X'$ represents an anion.

2. A dyestuff of the formula:

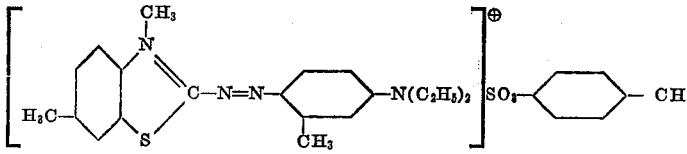

3. A dyestuff of the formula:

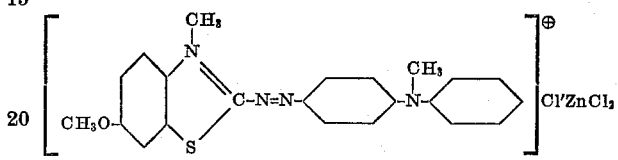

4. A dyestuff of the formula:

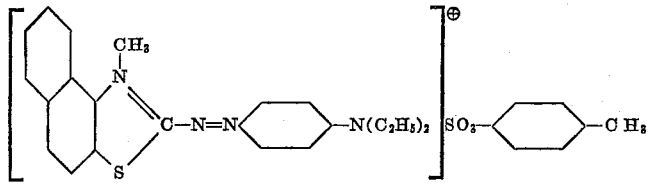

5. A dyestuff of the formula:

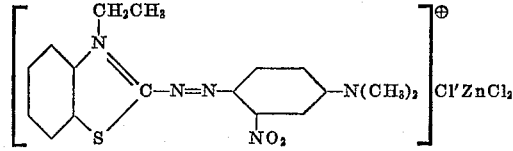

6. A dyestuff of the formula:

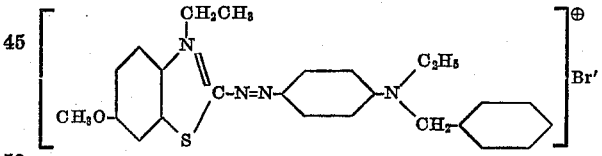

References Cited in the file of this patent

UNITED STATES PATENTS

| 2,135,293 | Renshaw et al. | Nov. 1, 1938 |
| 2,441,612 | Argyle et al. | May 18, 1948 |

FOREIGN PATENTS

| 136,921 | Switzerland | Feb. 17, 1930 |
| 1,049,896 | France | Aug. 26, 1953 |

OTHER REFERENCES

Saunders: The Aromatic Diazo-Compounds (2nd ed.), 1949, pp. 78–79.